United States Patent [19]

Rumyantseva et al.

[11] 4,301,251

[45] Nov. 17, 1981

[54] PROCESS FOR PRODUCING ROSE OIL

[76] Inventors: Galina N. Rumyantseva, Ryazansky prospekt, 78/1, kv. 208; Renata N. Grebeshova, ulitsa akademika Pavlova, 40, kv. 31; Kalust A. Kalunyants, mikroraion Kapotnya, kvartal 4, dom 3, kv. 34; Irina V. Artemieva, Nagatinskaya naberezhnaya, 22, korpus 2, kv. 192, all of Moscow; Raisa D. Lomakina, ulitsa Zheleznodorozhnaya, 3, kv. 66, Simferopol, all of U.S.S.R.

[21] Appl. No.: 119,120

[22] Filed: Feb. 6, 1980

[30] Foreign Application Priority Data

Feb. 7, 1979 [SU] U.S.S.R. .............................. 2724414

[51] Int. Cl.$^3$ .............................................. C07G 17/00

[52] U.S. Cl. ................................ 435/267; 260/236.6; 435/262; 435/911; 435/945

[58] Field of Search .......................... 260/236.5, 236.6; 435/101, 156, 157, 166, 262, 267, 271, 911, 945

[56] References Cited

FOREIGN PATENT DOCUMENTS

| | | | |
|---|---|---|---|
| 15312 | 6/1971 | Bulgaria . | |
| 1000014 | 8/1965 | United Kingdom | 435/267 |
| 187196 | 11/1966 | U.S.S.R. | 260/236.6 |
| 571505 | 9/1977 | U.S.S.R. | 260/236.6 |
| 598933 | 3/1978 | U.S.S.R. | 435/911 |
| 639923 | 12/1978 | U.S.S.R. | 435/267 |

OTHER PUBLICATIONS

Tbilisi, "Essential-Oil Industry of Georgian SSR", *App. Biochem. & Microbilogy*, vol. XII, Issue 5, 1976.

Sikharulidze et al., "Isolation & Identification of B-- Phenylethyl-B-D-Glucopyranoside from Rose Petals," Bakh Institute of Biochemistry, USSR Academy of Sciences, Mar. 1976, pp. 759-762.

*Primary Examiner*—Peter A. Hruskoci

*Attorney, Agent, or Firm*—Robert E. Burns; Emmanuel J. Lobato; Bruce L. Adams

[57] ABSTRACT

A process for producing rose oil comprising a preliminary enzymatic treatment of the vegetable feedstock—-fresh rose flowers or wastes from rose extraction in an aqueous medium at a ratio between the feedstock and water of 1:1.5-3.0 respectively at a temperature ranging from 40° to 45° C. and a natural pH of the feedstock with water for 2 to 4 hours using enzymatic preparations comprising products of biosynthesis of microorganisms of genus Trichoderma or Geotrichum and containing active beta-glucoside-hydrolases specific in respect of rose glycosides and enzymes hydrolyzing structural polysaccharides of plants, taken separately or in combination in an amount of from 0.1 to 0.5% by weight of the starting feedstock; then the treated vegetable feedstock is subjected to hydrodistillation and the desired product is recovered from the resulting hydrodistillate.

6 Claims, No Drawings

PROCESS FOR PRODUCING ROSE OIL

FIELD OF THE INVENTION

The present invention relates to the essential-oil industry and, more specifically, it relates to a process for the manufacture of rose oil extensively used in the perfumery, food and pharmaceutical industries, as well as the starting material in the manufacture of various synthetic products.

BACKGROUND OF THE INVENTION

Currently, two basic ways are known of improving the process for recovery of rose oil from the vegetable feedstock, namely: thermal fermentation of the feedstock based on the effect of proper enzymes of rose plants, and the use of cultures of microorganisms. However, both groups of processes feature a number of essential disadvantages and do not enable a sufficiently complete recovery of the final product with high quality characteristics.

A process is known in the art for producing rose oil by way of thermal incubation of the vegetable feedstock, such as rose flowers based on the effect of proper enzymes of the plant (autofermentation). The starting stock is combined with a 15% solution of NaCl or water in a ratio of the feedstock:water of 1:2.5 respectively and maintained at the temperature of 45° C. for 4 to 6 hours or at a temperature of from 22° to 27° C. for 6 to 48 hours. The recovery of rose oil is effected by hydrodistillation for 6–7 hours, followed by adsorption of the oil in a column with activated carbon and desorption with ethyl ether. (Cf. "Essential-Oil Industry of Georgian SSR", Tbilisi, 1968; "Applied Biochemistry and Microbiology", vol. XII, issue 5, 1976 /in Russian/).

The technique employed is rather simple, though possessing such disadvantages as a low yield of oil (0.06–0.013%) and a poor quality of the final product. The content of monoterpene alcohols—the most valuable components—is only 8.5 to 12.0%, the content of β-phenylethyl alcohol—the less valuable component—is as high as 85–90%.

Also known in the art is a process for producing rose oil based on the effect of enzymes of plants (rose flowers) under anaerobic conditions without the addition of water. The process of pre-treatment of the feedstock is effected in hermetically sealed polyethylene bags at room temperature for 48 hours. The subsequent operations comprise treatment of the material with petroleum ether in extraction columns at room temperature and recovery of absolute ethereal rose oil.

The yield of rose oil produced in this manner is at the level of 0.03% by weight of the starting feedstock. Quality of the oil in respect of terpene alcohols and β-phenylethyl alcohol is higher than that of rose oil produced by way of a thermal incubation with a subsequent hydrodistillation.

Therefore, this prior art process features a very low yield of rose oil and instability of the process conditions. Furthermore, the process also features certain technological difficulties such as the necessity of creating anaerobic conditions for enzymes, i.e. collect the starting feedstock and hermetically seal polyethylene bags directly at the plantations. All this is associated with large additional expenses for the materials and equipment. This process does not enjoy a commercial implementation (USSR Inventor's Certificate No. 478057, Cl. Int. C 11 B 9/02, published July 25, 1975, Bulletin No. 27).

A microbiological process is also known in the art for the production of rose oil involving a preliminary treatment of the rose stock by means of cultures of special strains of microorganisms of the genus Aspergillus, Licoperdon, Monilla, Saccharomyces. As the starting stock use is made of the waste products resulting from hydrodistillation; the process is conducted at a temperature within the range of from 25° to 40° C. and the pH value of 4.5 for 26 hours.

The recovery of rose oil from the wastes is effected by a repeated hydrodistillation, followed by adsorption and desorption of the oil and distilling-off of the solvent.

The process makes it possible to recover an additional amount of rose oil (about 0.02% by weight of the starting stock) from the waste products (cf. Bulgarian Pat. No. 15312, published June 25, 1971).

This process, however, features but a low yield and poor quality of the desired product. Moreover, the process has certain difficulties such as the necessity of preparation of the inoculation culture of fungi under the conditions of the rose oil manufacture, additional expenses for the preparation of the feedstock-dehydration of the waste products, as well as process instability and long duration.

This process does not enable the production of rose oil having standard quality.

BRIEF SUMMARY OF THE INVENTION

It is the main object of the present invention to increase the yield of the desired product, i.e. rose oil.

It is another important object of the present invention to improve the quality of rose oil due to an increased content of more valuable components—monoterpene alcohols therein and a lowered content of a less valuable component—β-phenylethyl alcohol.

still another object of the present invention is to simply the process reduce time required therefor.

The main and other objects of the present invention are accomplished by a process for the production of rose oil involving a preliminary fermentative treatment of the vegetable feedstock in an aqueous medium, hydrodistillation and a subsequent separation of rose oil from the resulting hydrodistillate. In accordance with the present invention said preliminary treatment of the starting vegetable feedstock—rose petals or waste products of rose raw materials resulting from the extraction process—is conducted in an aqueous medium at a ratio between the starting feedstock and water of 1:1.5–3.0 respectively at a temperature within the range of from 40° to 45° C. and a natural pH of the feedstock with water for a period of from 2 to 4 hours using enzymatic agents which are the products of the biosynthesis of microorganisms pertaining to the genus Trichoderma, Geotrichum and containing active beta-glucoside-hydrolases specific with respect of glycosides to rose, as well as enzymes hydrolyzing structural polysaccharides of the plants taken separately or in combination in an amount of from 0.1 to 0.5% by weight of the starting feedstock.

In order to increase the yield and improve the quality of the desired product, as the enzymatic agent it is preferable to use a preparation which is the product of the biosynthesis of microorganisms of species Trichoderma lignorum or Trichoderma koningii, or Geotrichum candidum and containing β-glucoside hydrolases specific with respect to rose glycosides with an activity of from 80 to 1,000 units/g and enzymes hydrolyzing structural polysaccharides of the plants exo-cellobiozide-hydrolase, endo-β-glucanase, cellobiase, β-xylanase, pectate-trans-eliminase.

In order to reduce the process duration, it is desirable to carry out hydrodistillation for a period of from 4 to 5 hours.

DETAILED DESCRIPTION OF THE INVENTION

The process according to the present invention is effected in the following manner.

As the starting feedstock use is made of fresh flowers of essential-oil rose. The starting feedstock may also comprise the waste products of rose material obtained in the recovery of rose oil by the extraction method. The vegetable feedstock is charged into an apparatus provided with a stirrer, whereinto water is also fed or a 15% solution of sodium chloride. The ratio between the feedstock and water is 1:1.5–3.0 respectively.

Into the same apparatus there is added a powder-like enzymatic agent comprising the product of the biosynthesis of microorganisms of genus Geotrichum or Trichoderma in an amount of from 0.1 to 0.5% by weight of the starting feedstock. As the agent producing such enzymatic preparations use may be made of different species of Trichoderma or Geotrichum, for example Trichoderma lignorum, Geotrichum candidum, Trichoderma koningii or Trichoderma viride and the like.

In the process according to the present invention use may be made of mixtures of said enzymatic preparations. These enzymatic preparations contain active beta-glucoside-hydrolases in their compositions.

Specificity of said enzymes with respect to rose glycosides has been shown by the inventors in experiments with a homogeneous beta-glucoside-hydrolase recovered from the preparation of Geotrichum candidum and pure substrates—natural rose glycosides. The mechanism of the enzyme effect resides in splitting of a glucose molecule from a molecule of the glycoside, i.e. in the reaction of transition of glycoside-combined forms of rose oil components to free terpene alcohols mainly geraniol, nerol, citronellol. Accumulation of the latter ensures a substantial improvement of quality of the rose oil composition and contributes to an additional yield of the final product.

Furthermore, said enzymatic preparations contain in their composition a certain range of enzymes which hydrolyze structural polysaccharides of the plants. These are cellulolytic enzymes, i.e. exocellobioside-hydrolase, endo-beta-glucanase and cellobiase which hydrolyze native cellulose; hemicellulases represented mainly by β-xylanases effecting hydrolysis of xylanes, as well as pectolytic enzymes which hyrolyze insoluble pectine substances such as pectate-trans-eliminases.

The combination of the above-mentioned enzymes destroys the cellular shell of the plants and intercellular binding agents. These biochemical processes enable a better recovery of free components of rose oil both in the stage of the preliminary fermentative treatment of the starting feedstock and in the subsequent hydrodistillation process.

The process of the enzymatic treatment of the feedstock is conducted at a temperature within the range of from 40° to 45° C. and at a natural pH of the feedstock with water. The process duration is 2 to 4 hours.

On expiration of this time, the starting feedstock in the solution is subjected to hydrodistillation which is effected in a distillation apparatus preferably for 4–5 hours. The mixture of vapours of water and oil (hydrodistillate) is cooled in coolers.

Then the hydrodistillate is fed to columns with activated coal, wherein adsorption of rose oil occurs. After saturation, the activated coal is charged into an extractor, wherein elution is effected with diethyl ether. The elution of rose oil is conducted for 12–18 times to the trace amounts of rose oils in the solvent. All the eluates are collected in a vacuum-evaporator, wherein distilling-off of diethyl ether is effected. The yield of rose oil is 0.165%.

In the case of using waste products from the extraction of the rose feedstock, these wastes products are also mixed with water or a 15% solution of NaCl and a powder-like enzymatic preparation or a mixture of such preparations is added thereto in an amount ranging from 0.1 to 0.5% by weight of the starting feedstock.

The biochemical transformations of glycosides and polysaccharides are similar to those occurring in fresh stock-rose flowers under the effect of the introduced enzymatic preparations.

The process of the enzymatic treatment of the starting feedstock and the subsequent processes of recovery of rose oil by the method of hydrodistillation, adsorption, desorption of the oil and distilling-off the solvent are conducted under technological parameters specified for the production of rose oil from the freshly collected raw material.

Therefore, the process according to the present invention makes it possible to increase the yield of rose oil as compared to the yield of rose oil ensured by the method of thermal incubation of the raw material by 25% to 150%. The process according to the present invention makes it possible to improve the quality of rose oil due to a 2 to 5-fold increase in the yield of more valuable components-monoterpene alcohols, mainly citronellol, nerol and geraniol.

Furthermore, in the process according to the present invention the duration of the enzymatic treatment of the raw material is reduced to 2–4 hours (compared to 26 hours as in the prior art process) and the stage of oil recovery by the hydrodistillation method—to 4–5 hours which, in turn, enables conservation of high quality characteristics of the desired product.

Simplification of the process scheme as compared to the prior art process resides in that the process of the enzymatic treatment of the starting feedstock necessitates no additional operations for preconditioning of the starting feedstock and materials, whereas in the case of utilization of microorganisms in the prior art process it is necessary to effectuate a sterile preparation and introduction of the inoculation culture, as well as a preliminary treatment of the starting feedstock—dehydration of the waste products. Furthermore, the process according to the present invention enables the process to be conducted at a natural pH of the starting feedstock with water, thus eliminating the addition of chemicals; it also enables stable process conditions and preparation of a standard-quality product, since the enzymatic preparations may be dispensed into the process according to their activity.

A positive feature of the process according to the present invention resides in that, as a result of the effect of the enzymatic preparations, a substantial amount of valuable products of hydrolysis of plant polysaccharides such as sugars, pectines, oligosaccharides are formed which products can be additionally recovered and used in the food industry or agriculture.

For a better understanding of the present invention some specific examples illustrating the process for the production of rose oil are given hereinbelow.

EXAMPLE 1

The starting feedstock—fresh flowers of essential-oil rose in the amount of 12 tons—is combined with a 15% solution of sodium chloride (the ratio between the feedstock and water is equal to 1:3 respectively). Into the mixture there is introduced 0.5% (by weight of the feedstock) of an enzymatic preparation comprising a product of biosynthesis of Trichoderma lignorum containing beta-glucoside-hydrolase with the activity of 140 units/g and enzymes hydrolyzing structural polysaccharides of the plants: exo-cellobioside-hydrolases, endo-beta-glucanases, cellobiases, beta-xylanases, pectate-trans-eliminases.

The enzymatic treatment is conducted for 2 hours at the temperature of 45° C. at a natural pH of the starting feedstock with water. The subsequent separation of the oil is conducted by the method of hydrodistillation which is effected in a distillation apparatus for 4 hours. The mixture of water vapours and oil (hydrodistillate) is cooled in coolers. Then the hydrodistillate is fed to columns with activated coal, wherein adsorption of rose oil occurs, followed by elution of rose oil with a solvent—diethyl ether and a subsequent distilling-off of the solvent.

Absolute yield of rose oil is 0.165% by weight of the starting feedstock. The content of monoterpene alcohols is equal to 21.9%.

EXAMPLE 2

The feedstock—fresh flowers of essential-oil rose in the amount of 50 g are combined with 150 ml of an aqueous solution of an enzymatic preparation comprising a product of biosynthesis of the microorganism Geotrichum candidum of the composition similar to that specified in the foregoing Example 1 with the activity of 160 units/g of beta-glucoside-hydrolase.

The amount of the enzymatic preparation is 0.5% by weight of the starting feedstock. The treatment of the feedstock with the enzymatic preparation is conducted for 4 hours under the conditions similar to those described in Example 1 hereinabove.

The hydrodistillation process is conducted for 5 hours. The subsequent operations of the oil recovery are the same as described in Example 1 hereinabove.

The absolute yield of rose oil is 0.113% by weight of the starting feedstock. The content of monoterpene alcohols is 21.5%.

EXAMPLE 3

The process is conducted in a manner similar to that described in Example 1. Use is made of 0.2% (by weight of the starting vegetable feedstock) of an enzymatic preparation comprising a product of biosynthesis of the microorganism Trichoderma koningii of a composition similar to that specified in Example 1 hereinabove with the activity of beta-glucoside-hydrolase of 80 units/g. The enzymatic treatment of the vegetable feedstock is effected for 4 hours, the hydrodistillation—for 5 hours. The subsequent recovery of rose oil is effected following the procedure described in Example 1.

The absolute yield of rose oil is 0.083% by weight of the starting feedstock. The content of monoterpene alcohols is 23.1%.

EXAMPLE 4

The process is conducted in a manner similar to that described in Example 1 hereinbefore.

Use is made of 0.1% (by weight of the vegetable feedstock) of an enzymatic preparation—the product of the biosynthesis of the microorganism Geotrichum candidum similar, in its composition, to that of Example 1 with the activity of beta-glucoside-hydrolase of 1,000 units/g. The enzymatic treatment of the vegetable feedstock is conducted for 3 hours, hydrodistillation—for 5 hours. The subsequent recovery of rose oil is carried out as described in Example 1.

The absolute yield of rose oil is 0.16% by weight of the starting feedstock. The content of monoterpene alcohols is 24.6%. Parallel to the process performed according to Examples 1 to 4, control experiments are conducted under the same conditions without any addition of the enzymatic preparations. The average absolute yield of rose oil in the control experiments is 0.066% by weight of the starting feedstock. The content of monoterpene alcohols is 8.5–12.3%.

The comparative data illustrating quality of the resulting rose oil as to the content of the basic components in Examples 1 through 4 and the control experiments are shown in Table 1 hereinbelow.

EXAMPLE 5

The process is conducted in a manner similar to that described in Example 1. As the starting feedstock use is made of 70 kg of wastes of rose flowers after extraction with petroleum ether. The vegetable feedstock is combined with an aqueous solution of a mixture of enzymatic preparations comprising products of biosynthesis of microorganisms Trichoderma lignorum and Geotrichum candidum taken in the ratio of 5:1 respectively (the ratio between the starting feedstock and water is 1:1.5 respectively).

The mixture of enzymatic preparation is taken in the amount of 0.3% by weight of the starting feedstock. The activity of beta-glycoside-hydrolase in the mixture of the enzymatic preparations is 150 units/g. The enzymatic treatment is conducted for 2.5 hours, hydrodistillation—for 5 hours. The subsequent recovery of rose oil is effected in a manner similar to that described in Example 1.

The absolute yield of rose oil from the wastes is 0.049%. As calculated for the fresh feedstock the increase in the yield of rose oil is 42%. The content of monoterpene alcohols is equal to 12.9%.

Parallel to the process, a control experiment is carried out under the same conditions without any addition of enzymatic preparations. The quality characteristics of the experimental and control rose oils are shown in the following Table 2.

TABLE I

Comparative characteristics of rose oil produced from fresh rose flowers

| Example No. | Enzymatic perparation | Test conditions | Content of components, % Linalol | Citronellol | Nerol | Ceraniol | Betaphenylethyl alcohol | Total of terpene alcohols | Perfumeric assesment |
|---|---|---|---|---|---|---|---|---|---|
| 1. | Trichoderma lignorum | Commercial | 1.7 | 3.3 | 6.7 | 10.2 | 73.0 | 21.9 | 4.5 |
| 2. | Geotrichum candidum | Laboratory | 0.2 | 2.2 | 8.2 | 10.9 | 72.5 | 21.5 | — |
| 3. | Trichoderma koningii | Laboratory | 0.4 | 2.6 | 8.3 | 9.8 | 67.9 | 23.1 | — |
| 4. | Geotrichum candidum | Laboratory | 0.1 | 3.0 | 11.3 | 10.2 | 66.1 | 24.6 | — |
| 5. | Control | Commercial | traces | 2.2 | 4.5 | 5.6 | 84.2 | 12.3 | 4.5 |

TABLE 2

Composition of rose oil produced from production wastes employed as the starting feedstock

| No. | Enzymatic preparation | Test conditions | Content of components, % Linalol | Citronellol | Nerol | Geraniol | Betaphenylethyl alcohol | Total of terpene alcohols |
|---|---|---|---|---|---|---|---|---|
| 1. | Trichoderma lignorum + Geotrichum candidum | Commercial | 2.4 | 6.5 | 1.5 | 2.5 | 72.5 | 12.9 |
| 2. | Control | Laboratory | traces | 0.3 | 1.7 | 0.4 | 87.6 | 2.4 |

What is claimed is:

1. A process for producing rose oil from vegetable feed stock selected from fresh rose flowers and waste rose flowers which have been subjected to a previous extraction, comprising:

subjecting said vegetable stock to an preliminary enzymatic treatment by contacting said vegetable stock with an enzymatic preparation in an amount of about 0.1 to 0.5% by weight based on the weight of said feedstock, said enzymatic preparation comprising products of biosynthesis of microorganisms from at least one genus selected from the group consisting of Trichoderma and Geotrichum and containing active beta-glucoside-hydrolases specific with respect to rose glycosides and enzymes which hydrolyze structural polysaccharides of said vegetable stock, said preliminary treatment being carried out in an aqueous medium containing about 1 part by wieght of said vegetable feedstock per 1.5 to 3.0 parts by weight of water, at a temperature of about 40° to 45° C., at the initial pH of the mixture of feedstock and water, for about 2 to 4 hours, hydrodistilling the thus treated vegetable feedstock and recovering rose oil from the resulting hydrodistillate.

2. A process as claimed in claim 1, wherein said enzymatic preparation comprises the products of the biosynthesis of microorganisms selected from the group consisting of species Trichoderma lignorum, Trichoderma koningii, Geotrichum candidum and containing beta-glucoside-hydrolases specific with respect to rose glycosides with an activity of from 80 to 1,000 units/g and enzymes which hydrolyze structural polysaccharides of the vegetable stock including exocellobioside-hydrolases, endo-beta-glucanases, cellobiases, beta-xylanases and pectate-trans-eliminases.

3. A process as claimed in claim 1, wherein said hydrodistillation is conducted for a period of from 4 to 5 hours.

4. A process according to claim 1 in which said enzymatic preparation comprises products of biosynthesis of microorganisms of the genus Trichoderma.

5. A process according to claim 1 in which said enzymatic preparation comprises products of biosynthesis of microorganisms of the genus Geotrichum.

6. A process according to claim 1 in which said enzymatic preparation comprises products of the biosynthesis of microorganisms of the genus Trichoderma and of the genus Geotrichum.

* * * * *